Figure 1:
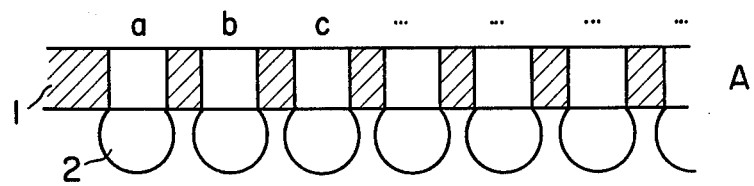
Figure 1:
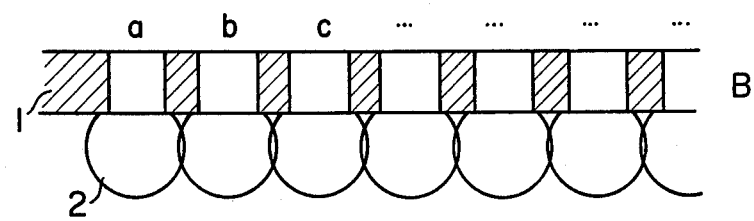

United States Patent [19]

Shono et al.

[11] 4,088,467
[45] May 9, 1978

[54] PROCESS FOR SPINNING GLASS FIBERS

[75] Inventors: Hiroaki Shono; Isao Wakasa; Toshiaki Kikuchi; Toshio Noji, all of Fukushima, Japan

[73] Assignee: Nitto Boseki Co., Ltd., Fukushima, Japan

[21] Appl. No.: 799,855

[22] Filed: May 23, 1977

Related U.S. Application Data

[63] Continuation-in-part of Ser. No. 656,880, Feb. 10, 1976, abandoned.

[51] Int. Cl.² ............................................. C03B 37/02
[52] U.S. Cl. ................................................. 65/2; 65/1; 65/374 M
[58] Field of Search ............. 65/1, 2, 374 R, 374 RM, 65/374 M

[56] References Cited

U.S. PATENT DOCUMENTS

| 3,353,943 | 11/1967 | Loutte | 65/374 R X |
| 3,414,454 | 12/1968 | Long | 65/374 R X |
| 3,905,790 | 9/1975 | Strickland | 65/1 X |

FOREIGN PATENT DOCUMENTS

| 930,934 | 2/1948 | France | 65/1 |
| 2,029,484 | 10/1970 | France | 65/1 |
| 763,160 | 12/1956 | United Kingdom | 65/1 |

Primary Examiner—Robert L. Lindsay, Jr.
Attorney, Agent, or Firm—Karl W. Flocks

[57] ABSTRACT

In a process for spinning glass fibers continuously from a nozzle plate having 25 – 200 orifices per cm², a start-up operation is improved by using the nozzle plate made of a material having a contact angle of 60° or more, drawing flooded molten glass which has spread over the whole undersurface of the nozzle plate at a greater speed than the flowing speed of the molten glass by its own weight from each orifice, while maintaining the normal spinning temperature, and finding the ends of the individual filaments.

3 Claims, 4 Drawing Figures

A

B

A

B

C

PROCESS FOR SPINNING GLASS FIBERS

RELATED APPLICATIONS

This application is a continuation-in-part of application Ser. No. 656,880 filed Feb. 10, 1976, now abandoned.

BACKGROUND OF THE INVENTION

In the spinning of glass fibers, there has long been desired flood-free operation, that is, to prevent a condition known as "flooding" from occurring. Flooding is defined as the covering or wetting of a substrate, such as the tip plate, the orifice (or nozzle) plate or sidewall of a feeder with molten glass which disrupts the formation of glass fibers.

In order to attain flood-free operation, there have been proposed various methods and apparatuses. British Patent No. 763,160 discloses the use of a feeder having a plurality of orifices disposed in or near the vertex of a V-member bottom plate made of a platinum-gold alloy (gold content 3 - 6%) in place of a tip plate. On the other hand, British Patent No. 1,049,517 discloses the use of a bushing containing about 1000 - 1200 tips made of a platinum-gold alloy (gold content 10 - 50%), wherein the wettability of platinum-gold alloys decreases as the gold content increases. British Patent No. 1,350,644 discloses the use of a feeder having a tip section made of a platinum-rhodium alloy (rhodium content 15 - 85%) containing an additional one or more metals, said alloy having increased contact angle. Contrary to the use of the bushing containing tips, the use of a tipless base plate made of a platinum-rhodium-iridium alloy is disclosed in British Patent No. 1,242,921. According to said British Patent No. 1,242,921, the base plate of a bushing has good non-wetting characteristics and the orifices in the tipless base plate can be more closely spaced than are the orifices in conventional tipped bushings. There have also been proposed materials having reduced wettablity for molten glass and suitable for making base plate for bushings in British Patent No. 1,318,201 (platinum-rhodium-gold alloys), French Patent No, 930,934 (graphite, and the like) and the like. It should be noted that these references are quite silent on a start-up operation after flooding occurs. Once flooding occurs it is very difficult to effect separation thereafter. So far as employing the methods and apparatuses of these references, the number of orifices or tips in the base plate or nozzle plate of a bushing has to be limited naturally in order to carry out continuous flood-free operation, which results in limited production of glass fibers.

In order to increase productivity of glass fibers, Strickland discloses in U.S. Pat. No. 3,905,790 the use of an orifice plate with a greater number of orifices therein, but the orifice plate used may be made of any alloy, wettable or non-wettable. According to Strickland, it is necessary to provide a temperature control for the creation and maintenance of the asymptotic geometry of the fiber forming cones formed at each orifice. In the Strickland process it is essential to direct a bulk flow of rapidly moving gas upwardly to the orifice area in the orifice plate to cool said cones to provide a stable cone formation and to maintain separation of cones thus preventing flooding. Further Strickland teaches various methods of start-up of the method of his invention, but these methods are complicated, much more difficult to control, time-consuming and costly since there is required the flow rate regulation either by temperature control of the orifice plate or direction of a steady flow of air to the plate, once flooding has occurred. There is no inventive idea in the Strickland patent to use positively useless flooded molten glass instead of the flow rate regulation.

DESCRIPTION OF THE INVENTION

It is an object of the present invention to provide an improved process for spinning glass fibers stably with excellent productivity by using a special nozzle plate having a large number of orifices per unit area, and easily finding the ends of individual filaments.

It is another object of the present invention to provide a start-up operation which is used each time a fiber breaks or at the beginning of the process of spinning glass fibers.

The present invention provides a process for starting up a method for the continuous spinning of glass fibers downwardly from a nozzle plate having a plurality of orifices by drawing an individual filament from each orifice and said plurality of orifices being in a horizontal nozzle plate attached to a lower surface of a melting furnace, the improvement which comprises using a nozzle plate made of a material having a contact angle of 60° or more to molten glass and containing 25 - 200 orifices per $cm^2$ so that molten glass effluent from the orifices may form combined beads, forming combined molten glass beads spread over the under surface of the nozzle plate, drawing the combined molten glass beads spread over the under surface of the nozzle plate at a greater speed than the effluent speed of the molten glass from each orifice so as to separate the molten glass into an individual filament from each orifice, while maintaining the normal spinning temperature, and finding the end of the individual filaments.

In the present invention, since a very compact nozzle plate having a large number of orifices is used, once a glass bead flowed from an orifice is combined with another glass bead, the combined molten glass beads immediately spread over the whole under surface of the nozzle plate and blanket the nozzle plate. Such a phenomenon has been an unfavorable trouble in the art, but contrary to the common knowledge in the art, the phenomenon is positively used for finding the ends of individual filaments in the present invention, According to the process of the present invention, since the special nozzle plate having a large number of orifices per unit area is used, the productivity of the nozzle plate per unit area is about 10 to 80 times as great as the conventional methods and glass fibers can be produced stably and continuously unlike the conventional methods.

In the present process, glass is melted down in a conventional melting furnace such as a bushing, a glass melting tank, or the like. At the bottom of the bushing, a special flat nozzle plate is attached. The nozzle plate must be made of a material having a contact angle of 60° or more to molten glass, preferably 90° or more.

Contact angle of the material to molten glass is measured as follows. A little glass bead (0.1 to 0.2 g) is placed on a flat plate made of the material to be measured, and the plate and the glass bead are put into a furnace in which the plate is placed horizontal, and kept for 1 hour at a constant temperature, e.g. 1100° to 1200° C. Then they are taken out and quenched in the air and on the cold stone. After that they are photographed from the exactly lateral direction. Then the contact angle is measured using a conventional method. It is known that the contact angle measured by this quenching method is almost equal to the contact angle at high temperatures.

In the present invention, when a contact angle to molten glass is 90° or more, it is defined that the material has non-wetting property, and when a contact angle is 60° or more and less than 90°, the material has little wetting property.

The materials having a contact angle of 90° or more to molten glass are particularly preferable to make a nozzle plate in the present invention. Examples of such materials are graphite (150° measured at 1100° C), boron nitride (130° measured at 1100° C), and the like. The materials having a contact angle of 60° or more and less than 90° to molten glass can sufficiently be used for making a nozzle plate, if the operation conditions are changed. Examples of such materials are a platinum-rhodium-gold alloy, a gold-palladium alloy, and the like.

The flat nozzle plate made of such materials as mentioned above has a large number of orifices per unit area so that the molten glass effluent from the orifices may form combined molten glass beads. More concretely, pitches between each orifice are 5 mm or less, preferably from 0.5 to 2.5 mm. Since the diameter of an orifice is usually from 0.3 to 2.0 mm, the number of orifices per unit area in the nozzle plate is preferably 25 to 200 per square centimeter. Since the number of orifices per unit area in a conventional flat nozzle plate made of a platinum-rhodium alloy is about 2.4 per square centimeter, the value of 25 - 200 is 10 to 80 times as many as the conventional value. Thus the yield of glass fibers per unit area of the nozzle plate can increase upto 10 to 80 times as much as that can be obtained in the conventional method.

The process of the present invention using such a special nozzle plate is explained in more detail below.

Combination of two or more streams of molten glass effluent from orifices in a nozzle plate is generally due to wetting property between the molten glass and the nozzle plate, that is, each stream of molten glass effluent from an orifice spreads outwards from the periphery of the orifice to combine each other. Therefore, in order to prevent the combination of two or more streams of molten glass on the under surface of a nozzle plate, it is necessary to provide a considerable distance (i.e. the pitch) between two or more orifices so that each molten glass bead formed from a stream of molten glass naturally extruding from an orifice should not be combined together. But even though the conditions as mentioned above are satisfied, it has been impossible even for a skilled worker to separate the combined molten glass beads into each independent stream of filament from each orifice and to find the end of an individual filament, so far as employing the conventional spinning process wherein each filament is drawn from each orifice.

On the contrary, according to the present process, the combined molten glass beads can easily be separated into individual filament and the end of each individual filament can easily be found, since the nozzle plate is made of a material having non-wetting or little wetting property, and the combined molten glass beads are drawn at a greater speed than the effluent speed of the molten glass from the under surface of the nozzle plate.

In the case of spinning glass fibers using a nozzle plate made of the material having a contact angle of 90° or more to molten glass, i.e. having non-wetting property, and pitches between each orifice being 5 mm or less, the following procedure can be employed. Since the number of orifices per unit area is very large, and molten glass wets itselves easily, each molten glass bead effluent (i.e. flowing by its own weight) from the orifices spreads on the under surface of the nozzle plate and combines each other to cover the whole area of the surface. Since the nozzle plate has non-wetting property against molten glass, when the molten glass blanketing the under surface of the plate with increased viscosity is drawn downwards at a greater speed than the effluent speed of the molten glass by its own weight from the nozzle plate attached to the base of the melting furnace, the molten glass spreading over the whole surface of the nozzle plate is pulled back to each periphery of orifice and easily separated into individual filament. The greater the viscosity of molten glass blanketing the under surface of the nozzle plate becomes, the easier the separation into individual filament becomes due to an increase in amount of the molten glass drawn downwards and influence of the tensile force. Thus the end of an individual filament can easily be found.

FIGS. 1A, 1B, 2A, 2B, 2C, 3 and 4 illustrate the various stages or states of spinning glass fibers by the disclosed invention.

Figure 2:
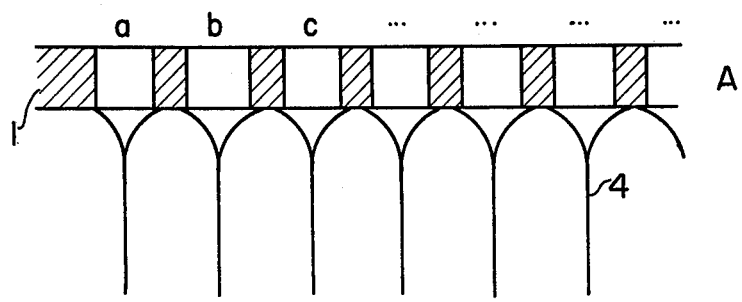
Figure 2:
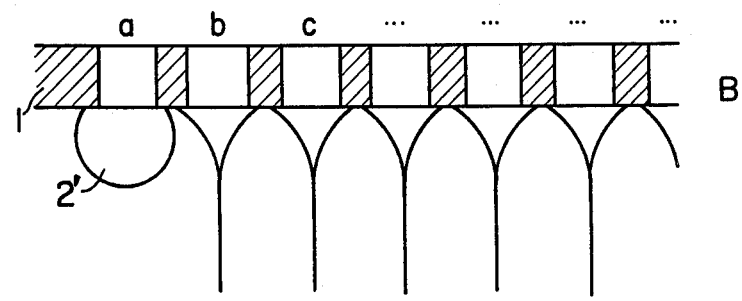
Figure 2:
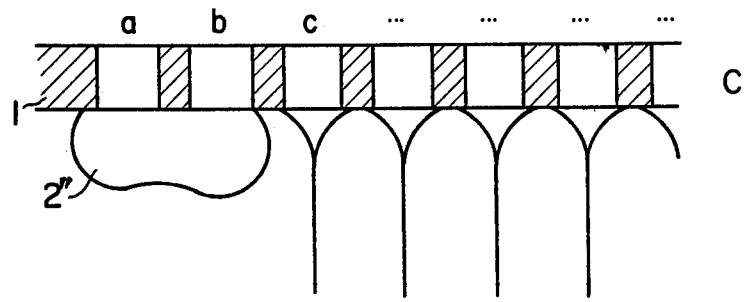
Figure 3:
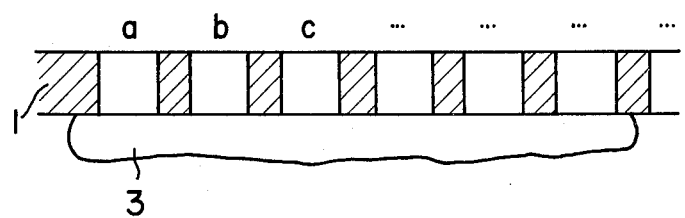
Figure 4:
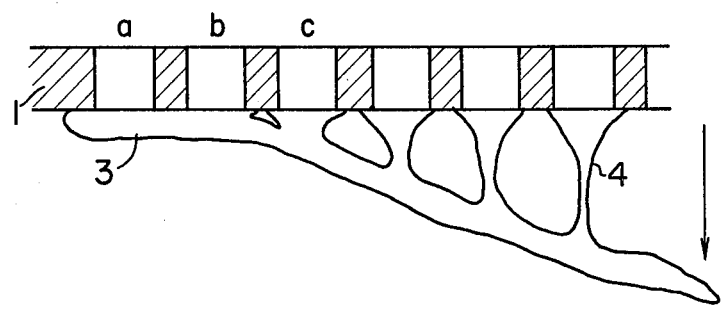

For the sake of easy explanation, the present invention is illustrated by the attached drawings. In the drawings a nozzle plate 1 has orifices a, b, c, . . . . FIG. 1 shows an initial stage of the spinning, in which molten glass flows from each orifice by its own weight, in other words, naturally, to form glass bead 2. Glass bead 2 grows larger with the lapse of time as shown in FIG. 1B. Since the number of orifices per unit area is very large, each molten glass bead flowing from the orifices spreads on the under surface of the nozzle plate and they combine with each other to cover the whole area of the surface as shown in FIG. 3. Since the nozzle plate has non-wetting property against molten glass, when the molten glass 3 blanketing the under surface of the plate is drawn downwards at a greater speed than the effluent speed of the molten glass from each orifice as shown in FIG. 4, the molten glass spreading over whole surface of the nozzle plate is pulled back to each periphery of orifice and easily separated into the individual filaments 4 as shown in FIG. 2A. FIG. 2A shows a stable state of the spinning.

On the other hand, if a filament is cut by some reasons as shown in FIG. 2B during the spinning, a glass bead 2' is formed. Glass bead 2' grows larger to combine with molten glass effluent from the adjacent orifice b. The combined molten glass beads grow larger and larger and at last blanket the under surface of the nozzle plate as shown in FIG. 3. Using the same procedure as mentioned above, each end of each filament can easily be found and the spinning of glass fibers can be continued easily.

In the case of spinning glass fibers using a nozzle plate made of the material having a contact angle of 60° - 90° to molten glass, i.e. having little wetting property, and pitches between each orifice being 5 mm or less, the separation of the combined molten glass beads into individual filament can easily be attained in the same manner as mentioned above, i.e. drawing downward at a greater speed than the effluent speed of the molten glass by its own weight, which has flowed from the orifices and blanketed the under surface of the nozzle plate with higher viscosity, so as to leave from the surface. If desired, an air stream can be directed to the combined molten glass beads blanketing the under surface of the nozzle plate to cool and increase the viscosity of the molten glass until stable windup of filaments begins. Thus the end of individual filament can easily be found. As far as tensile force affects efficiently to the periphery of orifices, the influence of surface tension to cut the filaments and to make glass beads decreases, and the stability of meniscus shaped under the orifices can be kept in good condition.

As is clear from the explanation mentioned above, such an operation as directing a bulk flow of rapidly moving gas upwardly to the orifice area in the orifice plate in order to maintain the asymptotic geometry of the fiber forming cones as taught by Strickland is not used in the present invention. Further, in the present invention, it is not necessary to provide a temperature control for the creation and maintenance of the asymptotic geometry of the fiber forming cones formed at each orifice as taught by Strickland. That there is no temperature control in the present process means that the normal spinning temperature is maintained. If combined molten glass beads are formed on the under surface of the nozzle plate, the ends of individual filaments can easily be found by drawing the combined molten glass beads at a greater speed than the naturally effluent speed of the molten glass from each orifice so as to separate the molten glass into individual filaments from each orifice, and spinning of glass fibers can be continued easily.

A nozzle plate made of graphite or boron nitride is by far superior to conventional ones in wetting and can be used for spinning glass fibers easily to obtain excellent products. A nozzle plate made of a platinum-rhodium-gold alloy having a contact angle of 60° or more to molten glass is very excellent in strength, durablity, oxidation resistance, and the like and can be used for stable spinning of glass fibers for a long period. On the other hand, the nozzle plate made of graphite or boron nitride is slightly inferior to that made of the above mentioned alloy in durability, but since the former has non-wetting property, it has many advantages such as easiness in operation, low cost, and the like.

The following examples will serve further to illustrate the present invention.

EXAMPLE 1

A nozzle plate made of graphite and having 87 orifices of 1.0 mm in diameter, the number of orifices per square centimeter being 29, was attached to the bottom of a conventional bushing. As glass, E-glass was used for spinning. From each orifice, molten glass was delivered at the rate of 0.3 g/min. Each molten glass bead naturally flowing from each orifice was combined together and blanketed the under surface of the nozzle plate while increasing the viscosity of the molten glass. Then the molten glass blanketing the surface was drawn downwards at a greater speed than the effluent speed of the molten glass from the orifices. The temperature of the nozzle plate was maintained unchanged. The combined molten glass beads was separated into individual filament, and the ends of individual filament could easily be found. The filaments were wound up at a speed of 1000 m/min. Glass filament with a diameter of 13 microns was obtained. Spinning temperature was 1120° C. The contact angle between the molten glass and the graphite was 150° at 1100° C.

Using a nozzle plate made of graphite and having 400 orifices of 1.0 mm in diameter, the number of orifices per square centimeter being 36, and using the same manner as mentioned above, glass filaments having the same fineness were obtaned at a windup speed of 500 m/min.

EXAMPLE 2

Using a nozzle plate made of boron nitride instead of graphite, the procedure of Example 1 was repeated to obtain the same results as Example 1. The contact angle between the molten glass and the boron nitride was 130° at 1100° C.

EXAMPLE 3

Nozzle plates made of the platinum-rhodium-gold alloy (composition: Pt 85.5% by weight, Rh 9.5% by weight and Au 5% by weight) and having orifices of 1.3 mm in diameter, the numbers of orifices being as shown in Table 1 were used. Each nozzle plate was attached to the bottom of a conventional bushing and spinning of glass fibers was carried out using E-glass as used in Example 1. From each orifice, molten glass was delivered e.g. at the rate of about 0.6 g/min. Each molten glass bead naturally exiting from each orifice was combined together and blanketed the under surface of the nozzle plate. Then the molten glass blanketing the surface was drawn downwards at a greater speed than the effluent speed of the molten glass from the orifices. The temperature of the nozzle plate was maintained unchanged. The combined molten glass beads were separated into individual filament and the end of individual filament could easily be found. The filaments were wound up at speeds of 1000 - 3000 m/min as shown in Table 1. Thus glass filaments with diameters of 6 - 10 microns were obtained as shown in Table 1.

Table 1

| Run No. | No. of orifices | No. of orifices per cm² | Windup speed (m/min) | Spinning temp. (° C) | Fineness (microns) |
|---|---|---|---|---|---|
| 1 | 100 | 29 | 3000 | 1160 | 10 |
| 2 | 400 | 36 | 3000 | 1160 | 10 |
| 3 | 800 | 45 | 2000 | 1150 | 8 |
| 4 | 2000 | 45 | 1000 | 1140 | 6 |

The contact angle betweeen the molten glass and the platinum-rhodium-gold alloy was 76° at 1200° C.

EXAMPLE 4

Using a nozzle plate made of the gold-palladium alloy (composition: Au 80% by weight and Pd 20% by weight), glass fibers were spun in the same manner as in Example 3 Run Nos. 1, 2 and 3. Almost the same results as in Example 3 Run Nos. 1, 2 and 3 were obtained. Since heat resistance of the gold-palladium alloy is inferior to that of the platinum-rhodium-gold alloy used in Example 3, the former has a disadvantage in useful life. The contact angle between the molten glass and the gold-palladium alloy was 82° at 1200° C.

REFERENTIAL EXAMPLE

A platinum-rhodium alloy which has widely been used for making a nozzle plate has a contact angle of 32° at 1200° C to molten glass. Using a nozzle plate made of the platinum-rhodium alloy, spinning of glass fibers was tried in the same manner as Example 3 Run No. 2. Since the platinum-rhodium alloy has wetting property to molten glass, separation of the filaments was very difficult and stable spinning of glass fibers could not be attained.

As is clear from the above examples, it is not only possible to spin glass fibers stably but also easy to produce very fine glass fibers since the finding of the ends of individual filaments is very easy according to the present process. It is also possible to increase production of glass fibers up to 10 to 80 times as much as the conventional process if a nozzle plate of the same area as used in the conventional process is used. Further it is possible to produce directly the strands composed of remarkably increased number of the filaments without employing conventional processes of warp beaming, doubling and the like. According to the present process, glass fibers can be produced in large scale and economically.

What is claimed is:

1. In a process for starting up a method for the continuous spinning of glass fibers downwardly from a nozzle plate having a plurality of orifices by drawing an individual filament from each orifice, said plurality of orifices being in a horizontal nozzle place attached to a lower surface of a melting furnace the improvement which consists essentially of the steps of using a nozzle plate made of a material having a contact angle of 60° or more to molten glass and containing 25 - 200 orifices per $cm^2$ so that molten glass effluent from the orifices may form combined beads, forming combined molten glass beads spread over the under surface of the nozzle plate, drawing the combined molten glass beads spread over the under surface of the nozzle plate at a greater speed than the effluent speed of the molten glass from each orifice so as to separate the molten glass into an individual filament from each orifice, while maintaining the normal spinning temperature, and finding the ends of the individual filaments.

2. A process according to claim 1, wherein the nozzle plate made of a material having a contact angle of 90° or more to molten glass is used.

3. A process according to claim 1, wherein the nozzle plate made of graphite or boron nitride is used.

* * * * *